(12) United States Patent
Albrecht et al.

(10) Patent No.: US 10,519,703 B1
(45) Date of Patent: Dec. 31, 2019

(54) GRILL HINGE

(71) Applicants: Ethan Albrecht, Chicago, IL (US);
Derek Bennion, Chicago, IL (US);
Steve Oshgan, Arlington Heights, IL (US)

(72) Inventors: Ethan Albrecht, Chicago, IL (US);
Derek Bennion, Chicago, IL (US);
Steve Oshgan, Arlington Heights, IL (US)

(73) Assignee: Weber-Stephen Products LLC, Palatine, IL (US)

( * ) Notice: Subject to any disclaimer, the term of this patent is extended or adjusted under 35 U.S.C. 154(b) by 0 days.

(21) Appl. No.: 16/031,699

(22) Filed: Jul. 10, 2018

(51) Int. Cl.
*E05D 7/10* (2006.01)
*E05F 1/12* (2006.01)
*E05D 11/06* (2006.01)
*A47J 37/07* (2006.01)

(52) U.S. Cl.
CPC ........ *E05D 7/1061* (2013.01); *A47J 37/0786* (2013.01); *E05D 11/06* (2013.01); *E05F 1/1246* (2013.01); *E05Y 2201/224* (2013.01); *E05Y 2201/47* (2013.01); *E05Y 2900/60* (2013.01)

(58) Field of Classification Search
CPC ............. E05D 7/1061; E05D 7/1066; E05D 2007/128; E05D 11/06; A47J 37/0786; E05F 1/1246; E05Y 2201/224; E05Y 2201/47; E05Y 2900/14; E05Y 2900/60; Y10T 16/53615; Y10T 16/5362; Y10T 16/53608; Y10T 16/5363; Y10T 16/535; Y10T 16/5595; Y10T 16/558
See application file for complete search history.

(56) References Cited

U.S. PATENT DOCUMENTS

| 819,098 | A | | 5/1906 | Underhill | |
|---|---|---|---|---|---|
| 1,863,323 | A | * | 6/1932 | Berne | E05D 7/12 16/256 |
| 2,131,802 | A | * | 10/1938 | Harmon | E05D 7/1077 16/258 |
| 2,557,146 | A | * | 6/1951 | Schatzman | B62D 25/184 280/848 |
| 2,732,580 | A | | 1/1956 | Schwaneke | |
| 2,990,570 | A | * | 7/1961 | Gilpatrick | E05D 7/12 16/257 |
| 3,567,065 | A | | 3/1971 | Dinse | |
| 3,611,915 | A | | 10/1971 | Glaser | |
| 3,666,134 | A | * | 5/1972 | Rauch | E05B 65/006 220/324 |
| 3,714,937 | A | | 2/1973 | Linstead | |
| 3,734,076 | A | | 5/1973 | Kiziol | |

(Continued)

OTHER PUBLICATIONS

Napoleon Charcoal Series brochure, Pro Charcoal Leg PRO22K-LEG, Apr. 2014, Canada.

(Continued)

*Primary Examiner* — Chuck Y Mah
(74) *Attorney, Agent, or Firm* — Vitale, Vickrey, Niro, Solon & Gasey LLP

(57) ABSTRACT

A hinge assembly for use on a grill that permits the selective removal of the lid from the bowl, the hinge assembly including a stationary bowl bracket affixed to the bowl, a pivotable middle bracket pivotably mounted to the bowl bracket and a removable lid bracket affixed to the lid and removably secured to the middle bracket.

20 Claims, 13 Drawing Sheets

(56) References Cited

U.S. PATENT DOCUMENTS

| | | | |
|---|---|---|---|
| 4,390,002 A | 6/1983 | Daily, III | |
| 4,649,599 A * | 3/1987 | Beller | A47J 36/12 |
| | | | 16/319 |
| 4,677,964 A * | 7/1987 | Lohmeyer | A47J 37/0713 |
| | | | 126/41 R |
| 4,766,643 A * | 8/1988 | Salazar | E05D 7/105 |
| | | | 16/222 |
| 4,932,390 A | 6/1990 | Ceravolo | |
| 5,016,607 A | 5/1991 | Doolittle | |
| 5,165,385 A | 11/1992 | Doolittle | |
| 5,323,758 A * | 6/1994 | Minshall | A47J 37/0786 |
| | | | 126/25 R |
| 5,355,558 A | 10/1994 | Vertanen | |
| 5,471,916 A | 12/1995 | Bird | |
| 5,582,094 A | 12/1996 | Peterson | |
| 5,865,099 A | 2/1999 | Waugh | |
| 5,926,917 A * | 7/1999 | Gantz | E05D 11/1071 |
| | | | 16/286 |
| 5,937,480 A * | 8/1999 | Kiefer | E05D 7/121 |
| | | | 16/260 |
| 5,941,228 A * | 8/1999 | McKenzie | E05D 7/1061 |
| | | | 126/25 R |
| 6,292,981 B1 | 9/2001 | Ford | |
| 6,363,925 B1 | 4/2002 | Chavana | |
| 6,401,299 B1 | 6/2002 | Schwarz | |
| 6,463,923 B2 | 10/2002 | Carley | |
| 6,701,577 B1 | 3/2004 | Yeh | |
| D507,957 S | 8/2005 | Nipke | |
| 7,419,196 B2 * | 9/2008 | Haugaard | F21V 17/107 |
| | | | 292/122 |
| 7,707,691 B2 * | 5/2010 | Jeong | F16M 11/10 |
| | | | 16/367 |
| 8,276,856 B2 * | 10/2012 | Wang | F16M 11/10 |
| | | | 248/121 |
| 8,739,367 B2 * | 6/2014 | Park | E05D 5/06 |
| | | | 16/240 |
| 9,289,095 B2 | 3/2016 | Goff, IV | |
| 9,603,484 B2 | 3/2017 | Cleveland | |
| 9,896,869 B2 | 2/2018 | Chung | |
| 10,138,047 B2 * | 11/2018 | Seiders | B65D 25/2808 |
| 2007/0097617 A1 * | 5/2007 | Searby | F16M 11/041 |
| | | | 361/679.4 |
| 2008/0078374 A1 | 4/2008 | Polkinghorn | |
| 2009/0308373 A1 | 12/2009 | Scott | |
| 2011/0271949 A1 | 11/2011 | Ortner | |
| 2013/0319258 A1 | 12/2013 | Cleveland | |
| 2017/0119209 A1 | 5/2017 | Jenks | |
| 2017/0367533 A1 | 12/2017 | Ebersold | |

OTHER PUBLICATIONS

Rosle USA, Inc. brochure, Mar. 31, 2016.
aquabbq.com, Spring Loaded Hinge Mechanism, Primo replacement parts.
appliancist.com, Grill Dome ceramic smoker grill—new Kamado grills from Infinity Series with auto hinge, Jan. 24, 2009.
bbqguys.com, Black Olive Charcoal Kamado Grill—On Cart.
Extended European Search Report dated Nov. 5, 2019 in corresponding European Application No. 19185242.5.

* cited by examiner

GRILL HINGE

FIELD OF THE INVENTION

The present inventions relate to hinges that attach the lid of a grill to the base of the grill. More particularly, the present inventions relate to hinges that enable removal of the lid and associated lid bracket from the middle bracket and bowl bracket which are attached to the base of the grill so that the lid may be easily removed and reinstalled on the base of the grill.

BACKGROUND OF THE INVENTION

Typical grills include a base, firebox or bowl that supports a fuel grate (or other fuel source) and a cooking grate. For example, gas grills have a firebox that supports the burners that are ignited for cooking and supports a cooking grate above the burners for placing the food. Charcoal grills typically have a bowl or firebox that supports a fuel grate upon which the charcoal is ignited. A cooking grate is also supported in the bowl above the fuel grate.

In either case, a lid may be provided. For gas grills, the lid is typically hinged to the rear of the firebox and is not removable. For Kamado-type grills, the lid is typically hinged to the base and is not readily removable. Charcoal grills, on the other hand, typically have removable lids that are not hinged to the bowl. When used, the lid of a charcoal grill must be placed on the ground or suspended from the side of the bowl using hanger assemblies, brackets and the like.

For ease of use and other reasons, many charcoal grill users desire to have the lid hinged to the bowl. However, when known hinges are used on charcoal grills, the lid is not removable or is only removable by complicated disassembly of the hinge. As a result, initial assembly is difficult. In addition, various accessories cannot be used or easily used when known hinges secure the lid to the bowl. For example, many rotisserie accessories require the removal of the lid so that an extension ring can be placed on the top of the bowl, the ring supporting the rotisserie motor, spit and the like. The lid is then placed on top of the extension ring. Although there are accessories available that may accommodate rings and the like without removing the lid from the bowl, the options are limited.

Accordingly, there is a need for a hinge that secures a lid to the bowl of a grill. There is also a need for the ability to easily and safely remove and reinstall the lid from the hinge portion on the bowl.

SUMMARY OF THE INVENTION

The present inventions preserve the advantages of known hinges and also provide new features and advantages, including the ability to remove and reinstall the lid to the base of a grill.

Accordingly, it is an object of the present invention to provide a hinge for use on a grill.

Another object of the present invention is to provide a hinge for mounting a grill lid to the grill firebox or bowl.

An additional object of the present invention is to provide a hinge for a grill, wherein the lid and hinge portion of the lid are removable from the remaining portions of the hinge assembly attached to the bowl and which may easily be reinstalled on the hinge.

A further object of the present invention is to provide a hinge for use on a grill, the hinge limiting the amount the lid can be opened.

Yet another object of the present invention is to provide a spring assisted hinge.

Yet a further object of the present invention is to provide a hinge assembly for a grill that permits removal/reinstallation of the lid (and an associated lid bracket of the hinge) from the bowl (and associated middle and bowl brackets mounted to the bowl).

Yet an additional object of the present invention is to provide a hinge that permits the safe and convenient removal of the lid and the safe and convenient reassembly of the lid to the bowl.

In accordance with a preferred embodiment of the present invention, a hinge for a grill, the grill having a bowl that supports a fuel grate and a cooking grate and a lid for covering the bowl is provided. The hinge includes: a stationary bowl bracket secured to the bowl, the bowl bracket projecting outwardly from the bowl; a pivoting middle bracket pivotably mounted to the bowl bracket; and a removable lid bracket secured to the lid and projecting outwardly from the lid, the lid bracket removably securable to the middle bracket such that the lid and lid bracket may be selectively removed from the middle bracket. The middle bracket may also include at least one stop or foot to limit the amount the lid may open. In other embodiments, the middle bracket may include an upper flange, the upper flange having an aperture that accepts a lid lock fastener. The lid bracket includes an upper lid attachment member, the upper lid attachment member having a lid lock slot that mates with and may be secured to the upper flange of the middle bracket with the lid lock fastener such that the lid may pivot about the hinge when the lid bracket is secured to the middle bracket. The lid and lid bracket may also be removed from the middle bracket when desired. In addition, at least one spring may be provided, the spring connected at one end to a spring flange on the bowl bracket and the other end connected to a spring flange on the middle bracket, the spring assisting in opening the lid. In a preferred embodiment, the middle bracket includes two side members and an alignment pin attached to each side member and the lid bracket includes two opposing guide flanges, each guide flange having a guide slot, the guide slots mating with the alignment pins on the middle bracket. It is also desirable that the middle bracket includes at least one stop or foot to limit the amount the lid may be opened. Preferably, the lid lock slot is a keyhole shape having a smaller portion opening to a larger portion opening.

Also provided is a hinge assembly for pivotably mounting a lid of a grill to a bowl of the grill, the hinge including: a bowl bracket affixed to an outer edge of the bowl, the bowl bracket including two generally parallel opposing side walls, each side wall including a lower spring mount. A middle bracket having two generally parallel and opposing side members, an upper flange extending between the two side members and an upper spring mount on the upper flange, the side members of the middle bracket pivotably mounted to the side walls of the bowl bracket are also provided. A lid bracket affixed to an outer edge of the lid, the lid bracket having two generally parallel opposing guide flanges, an upper lid attachment member extending between each guide flange, the lid bracket removably secured to the middle bracket are further provided. Also included is at least one spring having two ends, one end attached to the upper spring mount on the upper flange of the middle bracket and the other end attached to the lower spring mount. In preferred embodiments, the upper flange of the middle bracket may include an aperture that accepts a lid lock fastener and the upper lid attachment member of the lid bracket includes a lid lock slot that cooperates with the lid lock fastener such that the lid bracket may be selectively secured to and removed from the middle bracket using the fastener. Other means for removably securing the lid bracket to the middle bracket are also contemplated. Embodiments also include an alignment pin that is attached to each side member of the middle bracket and each guide flange of the lid bracket includes a guide slot that cooperates with the alignment pin such that the lid bracket is guided into engagement with the middle bracket. In addition, at least one side member of the middle bracket includes at least one stop that cooperates with the bowl bracket to limit the amount the lid bracket and lid may open. The lid lock slot is preferably key shaped.

The present inventions also provide for a hinge assembly for pivotably and removably mounting a lid of a grill to a bowl of a grill, the hinge assembly comprising: a bowl bracket affixed to the bowl of the grill, the bowl bracket having a bowl attachment flange to be affixed to an outer edge of the bowl and two generally parallel opposing side walls; a middle bracket having two generally parallel and opposing side members, an upper flange extending between the two side members and including a threaded aperture, two alignment pins, one affixed to each side member and at least one stop that is capable of engaging the attachment flange of the bowl bracket, the middle bracket pivotably mounted to the side walls of the bowl bracket; a lid bracket affixed to the lid of the grill, the lid bracket having two generally parallel, opposing guide flanges, each guide flange including a guide slot that cooperates with the alignment pin of the middle bracket, an upper lid attachment member between the guide members, and a lid lock slot on the upper lid attachment member; and a lid lock fastener that cooperates with the threaded aperture of the middle bracket, the lid lock fastener releasably securing the lid bracket to the middle bracket such that the lid (and lid bracket) may be pivoted from a closed position to an open position and the lid and lid lock bracket may be removed from the remainder of the hinge assembly using the lid lock fastener. The middle bracket may be provided with at least one stop that interacts with the bowl bracket to limit the amount that the lid may be pivoted upward. A handle portion may be provided on the upper lid attachment member of the lid bracket. And, in other embodiments, at least one spring is provided, the spring having two ends, one end attached to a lower portion of the bowl bracket and the other end attached to an upper portion of the middle bracket.

Also provided is a hinge assembly for use on a grill, the grill having a bowl and a lid for covering the bowl. The hinge assembly includes: a bowl bracket affixed to the bowl; a middle bracket including means for pivotably mounting the middle bracket to the bowl bracket; a lid bracket affixed to the lid; and means for removably attaching the lid bracket to the middle bracket. In one embodiment, the means for removably attaching the lid bracket to the middle bracket includes an upstanding threaded post on the middle bracket, an aperture on the lid bracket and a removable nut cooperating with the upstanding post to releasably secure the lid bracket to the middle bracket. In addition, the means for pivotably mounting the middle bracket to the bowl bracket may include mating apertures on the bowl and lid brackets and a cooperating fastener.

Inventor's Definition of the Terms

The following terms which may be used in the various claims and/or specification of this patent are intended to have their broadest meaning consistent with the requirements of law:

"Grill" as used herein shall include charcoal grills, Kamado grills, gas grills and pellet grills.

"Bowl" as used herein shall mean the base, firebox or bowl of a grill that has an upward facing opening at the top. The bowl typically supports a fuel grate in non-gas grills, which in turn supports the fuel to be burned. In gas grills, the bowl directly or indirectly supports the burners. The bowl also supports a cooking grate at or near the top opening of the bowl upon which the food to be cooked is placed.

"Lid" as used herein shall mean the cover of the grill having a downwardly facing opening at the open bottom which mates with and has a shape coinciding with the opening at the top of the bowl to enclose the space above the cooking grate. Lids may include handles, vents, thermometers and the like.

Where alternative meanings are possible, in either the specification or claims, the broadest meaning is intended consistent with the understanding of those of ordinary skill in the art. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but not excluding the plural) will become apparent from the following descriptions and drawings, wherein like reference numerals represent like elements in the various views, and in which.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

The present inventions are described herein by reference to a typical charcoal grill having a bowl and a lid. It will be understood that the present inventions may be applied to any type of grill. In addition, although the inventions are described installed and used on a grill, it will be understood that the inventions may be used in non-grill applications. It should be noted that when certain figures are specifically referenced, other figures also show the items being described.

Figure 11:
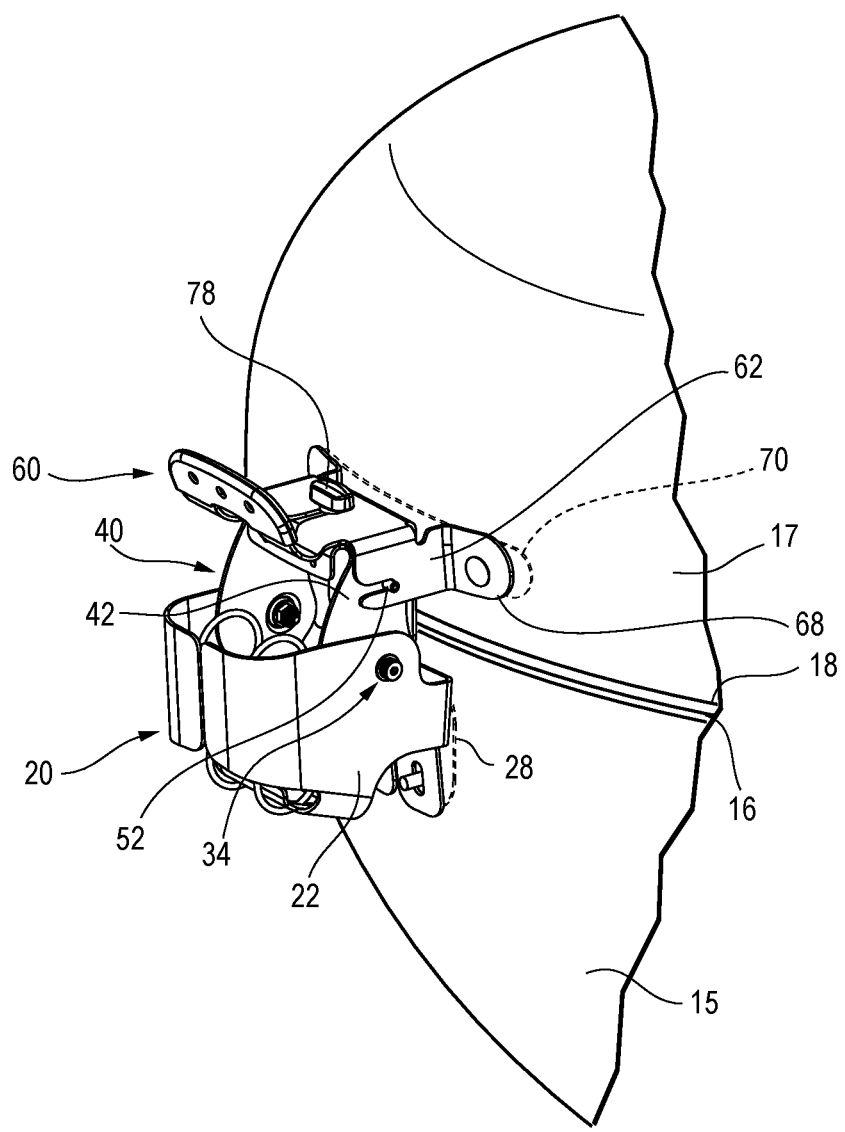
FIG. 11 is a perspective view of the preferred hinge of the present invention with the preferred lid bracket attached to a typical lid and the middle and bowl brackets attached to a typical bowl of a representative charcoal grill, with the lid and lid bracket shown in a closed position.
Figure 12:
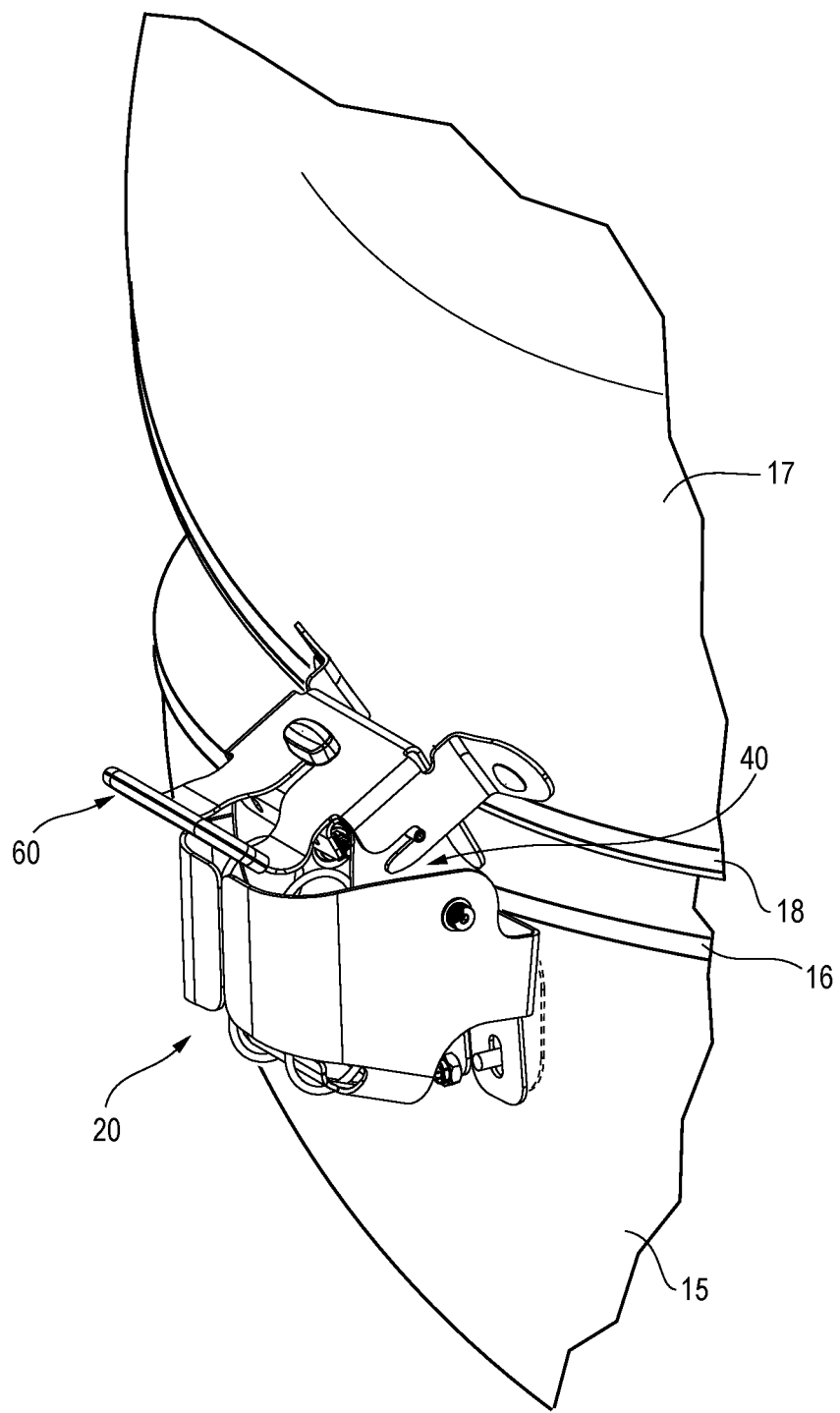
FIG. 12 is a perspective view of the hinge of FIG. 11 with the lid and lid bracket shown in an open position.
Figure 13:
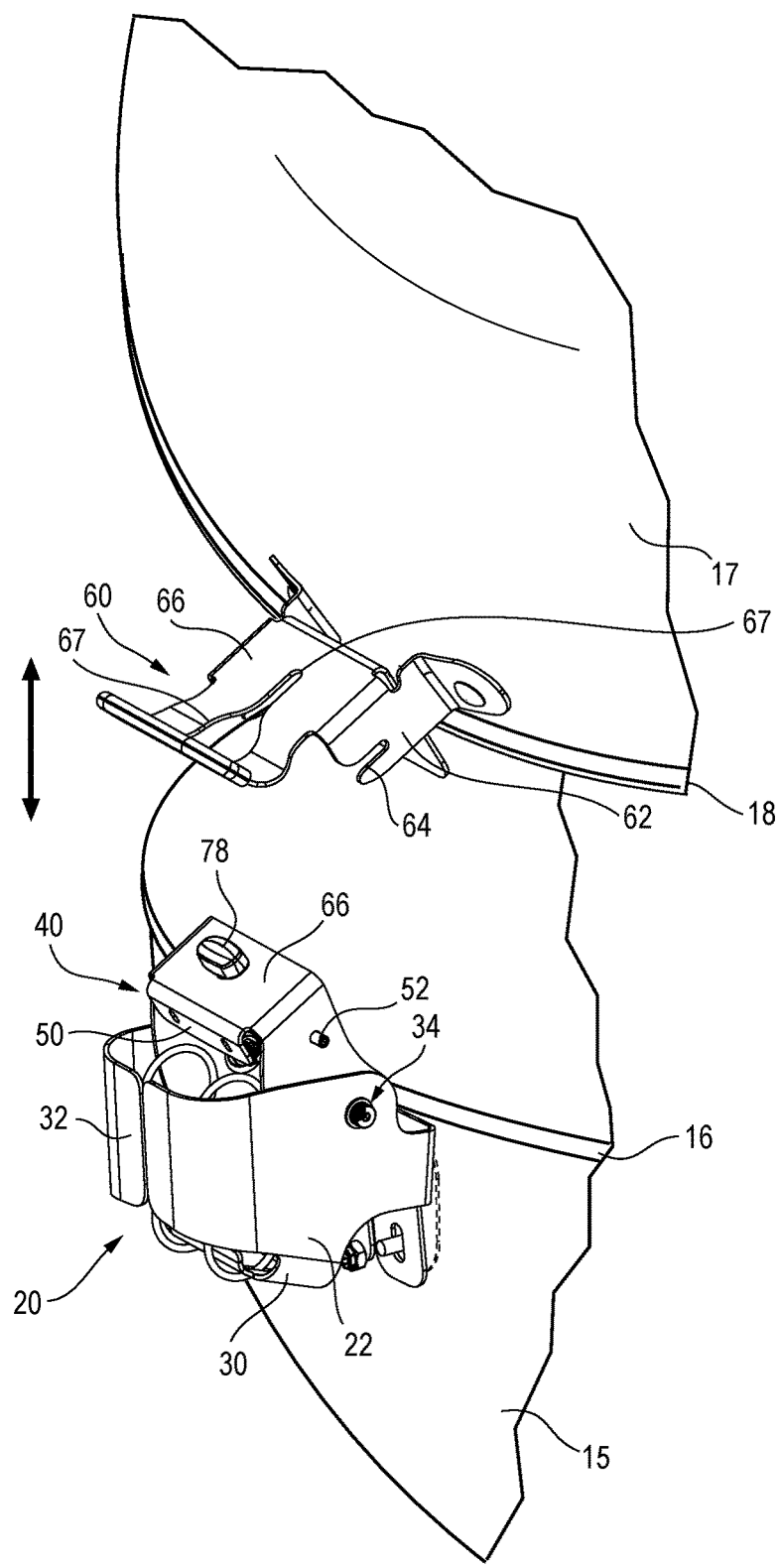
FIG. 13 is a perspective view of the preferred hinge of FIG. 11 shown with the preferred lid bracket and associated lid removed from the preferred middle bracket, bowl bracket and associated bowl of the grill.

A typical grill includes a bowl 15 and a lid 17 (see e.g., FIGS. 11-13). Bowl 15 has an upward facing opening defined by a peripheral upper lip 16. Lid 17 has a downwardly facing opening defined by a peripheral lower lip 18. Lower lip 18 mates with upper lip 16. It will be understood by those of skill in the art that the bowl 15 and mating lid 17 may take a variety of cross-sectional shapes, including generally square, rectangular or circular, and that the inventions are applicable to any shape.

A preferred embodiment of the hinge assembly of the present inventions is shown generally as 19 in the figures. A preferred embodiment of hinge 19 consists of three principal components that cooperate with each other to achieve the major goals and advantages of the present inventions. Specifically, hinge 19 includes a bowl bracket 20 which is affixed to bowl 15, a middle bracket 40 which is pivotably mounted to bowl bracket 20 and a lid bracket 60 that is affixed to lid 17. As hereinafter described, lid bracket 60 is removably secured to middle bracket 40 so that associated lid 17 may be removed from the bowl. Also as hereinafter described, lid bracket 40 is typically affixed to lid 17 in a manner that is not intended to be removed from the lid 17 during normal operation. Similarly, bowl bracket 20 (and cooperating middle bracket 40) is typically affixed to the bowl 15 in a manner that is not intended to be removed from the bowl 15 during normal operation.

The structure of a preferred embodiment of the lid bracket 60, middle bracket 40 and bowl bracket 20 may be seen by reference to FIGS. 1-4, although reference may be made to all of the figures. Preferred bowl bracket 20 includes two generally parallel and opposing side walls 22. Formed as part of or attached to side walls 22 are bowl attachment flanges 24, having an optional aperture 25. Bowl mounting tabs 26 may be attached to or formed as part of bowl attachment flanges 24 and may be provided with an aperture 27. A bowl mounting plate 28 may also be provided to aid in the attachment of bowl bracket 20 to bowl 15 as hereinafter described.

Side walls 22 may also include lower spring mount 30 having an aperture 31, which may be formed from or attached to side walls 22 and are preferably perpendicular thereto. It will be understood that only one lower spring mount 30 may be provided on one side wall 22, although one on each side wall 22 is preferred. Alternatively, one lower spring mounting bracket may interconnect between both of the side walls 22.

Opposite bowl attachment flanges 24 are outer walls 32 of bowl bracket 20. Outer walls 32 are generally perpendicular to side walls 22 and may be formed from or attached thereto in a variety of well known means. In the preferred embodiment, outer walls 32 serve to enclose bowl bracket 20 to prevent access to pinch points by grill users.

Each side wall 22 of bowl bracket 20 includes pivot means or members 34. Pivot means 34 is used to pivotably mount middle bracket 40 to bowl bracket 20. In the preferred embodiment, pivot means 34 takes the form of apertures on side walls 22 that accept a nut 36 and bolt 35 upon which middle bracket 40 may be pivotably mounted. Alternatively, pivot means 34 may be a pin (not shown) that cooperates with the middle bracket 40. Those of ordinary skill in the art will understand that there are a variety of well known ways to pivotably mount middle bracket 40 to bowl bracket 20.

As shown in FIGS. 11-13, bowl bracket 20 is affixed to the outside of bowl 15 near the lip 16 and opening. In the preferred embodiment, bowl attachment flanges 24 and mounting tabs 26 are on the outside of bowl 15. Holes are provided through bowl 15. Bowl mounting plate 28 is placed inside bowl 15 and includes threaded posts 29. The posts 29 are aligned with apertures 25 and 27 of the bowl attachment flanges 24 (or alternative bowl mounting tabs 26), which are secured by nuts 23. It will be understood by those of skill in the art that bowl bracket 20 may be secured to bowl 15 by other means, such as rivets, welding or a band surrounding the circumference of bowl 15 to secure the bowl bracket 20 thereto.

Preferred middle bracket 40 is pivotably mounted to bowl bracket 20. Pivotable middle bracket 40 includes two generally parallel and opposing side walls 42. In the preferred embodiment, each side wall 42 has a downwardly extending portion that includes a foot 44 at its lower end. Foot 44 may be formed from or attached to side walls 42. Each foot 44 is generally perpendicular to side walls 42. Although the preferred embodiment includes two feet 44, it will be understood by those of skill in the art that one foot 44 may be utilized, or no feet 44 may be incorporated into hinge assembly 19. Preferably, each foot 44 is to abut the inside wall of bowl attachment flange 24 as hereinafter described. It will be understood by those of skill in the art that feet 44 may be of a different configuration and may abut other portions of bowl bracket 20. In the preferred embodiment, feet 44 limit the opening of the lid 17 (and middle bracket 40) to sixty degrees (60°) for safety and to avoid tipping of the grill. In addition, one of ordinary skill in the art will understand how to properly size, shape and attach foot 44 to side wall 42 of middle bracket 40. Typical factors will include the size, configuration and shape of the embodiment of the bowl bracket 20 and the amount that middle bracket 40 and lid bracket 60 (and hence lid 17) is designed to open.

In the preferred embodiment, each side wall 42 of middle bracket 40 is provided with an aperture 46. Aperture 46 is positioned to mate with pivot means 34 of bowl bracket 20. In particular, middle bracket 40 pivots about bolt 35 of pivot means 34. Alternatively, side walls 42 may be provided with posts (not shown) that are designed to fit with corresponding apertures (not shown) on side members 22 of bowl bracket 20. As previously indicated, other ways to pivotably mount middle bracket 40 to bowl bracket 20 will be known to those of ordinary skill in the art.

In addition, side walls 42 of middle bracket 40 are shown as fitting within and being povitably mounted on the inside of opposing side walls 22 of bowl bracket 20. This is preferred because, among other things, collection of debris inside hinge assembly 19 is minimized and the potential pinch points for the user decreased. It will be understood by those of ordinary skill in the art that in other embodiments, side walls 42 of middle bracket 40 may be located on the outside of side walls 22 of bowl bracket 20 and pivotably mounted thereto.

Also in the preferred embodiment of middle bracket 40, each side wall 42 is interconnected with a generally perpendicular upper flange 48. Upper flange 48 includes an aperture 49, which is preferably threaded to accept lid lock fastener 78 as hereinafter described. Attached to or formed as part of upper flange 48 is a spring flange 50. Spring flange 50 preferably includes one or more holes 51 that function to support an upper end 57 of optional spring 58, the lower end 59 of spring 58 being supported by lower spring mount 30 of bowl bracket 20.

Each side wall 42 of middle bracket 40 is provided, in the preferred embodiment, with an outwardly projecting alignment pin 52. Although an alignment pin 52 on each side wall is preferred, only one alignment pin 52 may be provided. Alignment pin 52 aids in guiding, engaging and supporting lid bracket 60 via guide slots 64 when installed, removed and/or reinstated onto middle bracket 40 as hereinafter described.

The third principal component of preferred hinge assembly 19 is lid bracket 60, which is removably secured to middle bracket 40 as hereinafter described. Lid bracket 60 includes two opposing and generally parallel guide flanges 62. Each guide flange 62 is provided with a guide slot 64 that opens outward from grill lid 17. Guide slots 64 are designed to mate with and slideably engage alignment pin 52 of middle bracket 40 as hereinafter described.

Formed as part of or attached to guide flanges 62 are bowl attachment flanges 68 having apertures 69. A lid mounting plate 70 may also be provided that, in conjunction with lid attachment flanges 68, affix lid bracket 60 to lid 17. Like the attachment of bowl bracket 20 to bowl 15 and as shown in FIGS. 11-13, the lid mounting flanges 68 are preferably on the outside of lid 17. Lid mounting plate 70 is positioned inside the lid 17. Corresponding holes are provided on lid 17 and the lid attachment flanges 68 and lid mounting plate 70 are secured together with fasteners 71. And, like bowl bracket 20, lid bracket 60 may also be secured to lid 17 by similar alternative means described above.

The opposing guide flanges 62 are interconnected by generally perpendicular upper lid bracket attachment member 66. In the preferred embodiment, upper lid bracket attachment member 66 includes an aperture or lid lock slot 67. In the preferred embodiment, lid lock slot 67 is keyhole shaped, i.e., having a larger opening leading to a smaller opening, to function as hereinafter described. A handle portion 72 may be provided as part of or attached to upper lid bracket attachment member 66. A plate 74 may also be provided that is formed as part of or attached to either the guide flanges 62 and/or the upper lid bracket attachment member 66. A lid lock fastener 78 or other means of removably securing lid bracket 60 to middle bracket 40 are provided and function as hereinafter described.

Figure 1:
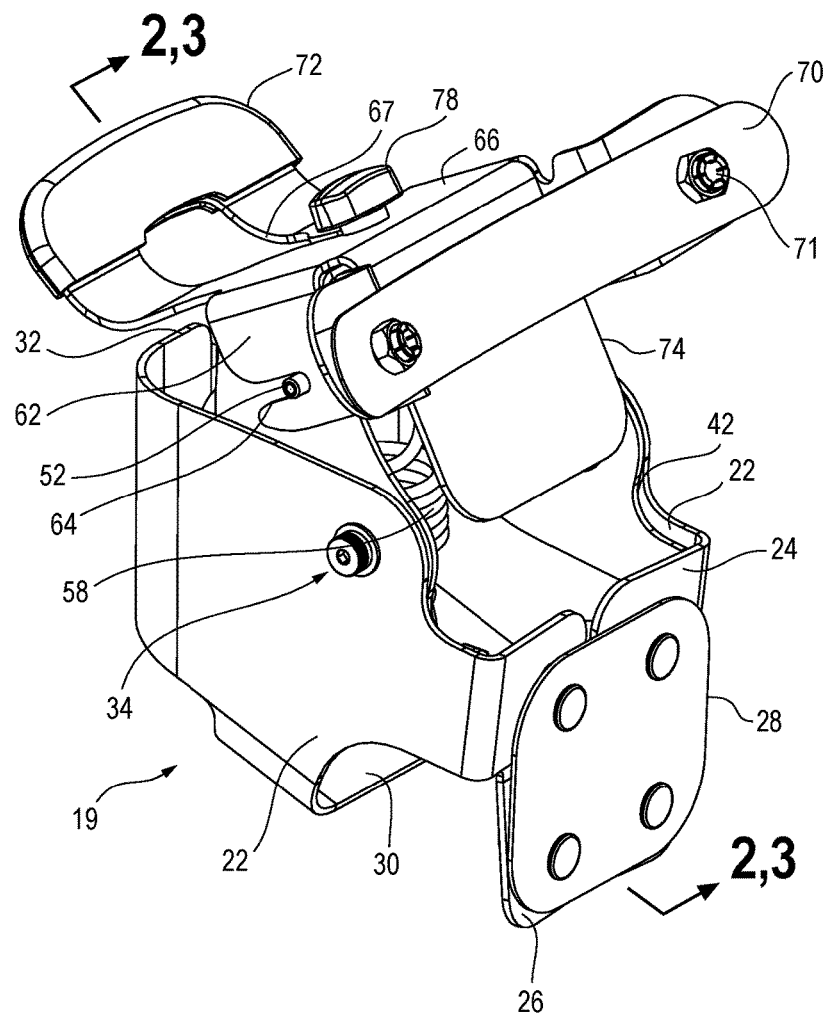
FIG. 1 is a perspective view of a preferred embodiment of a hinge assembly of the present invention.
Figure 2:
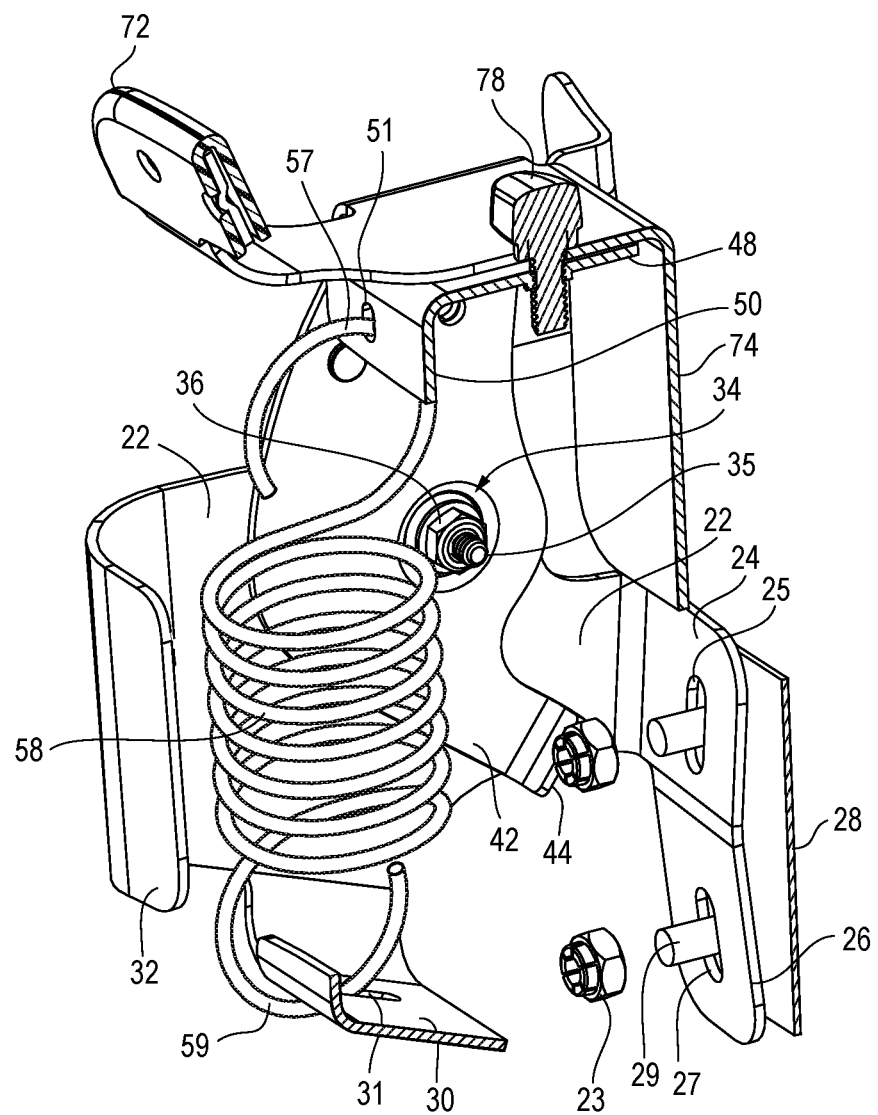
FIG. 2 is a cross-sectional perspective view of the hinge of FIG. 1 taken along line 2-2 and showing the hinge assembly in a closed position.
Figure 3:
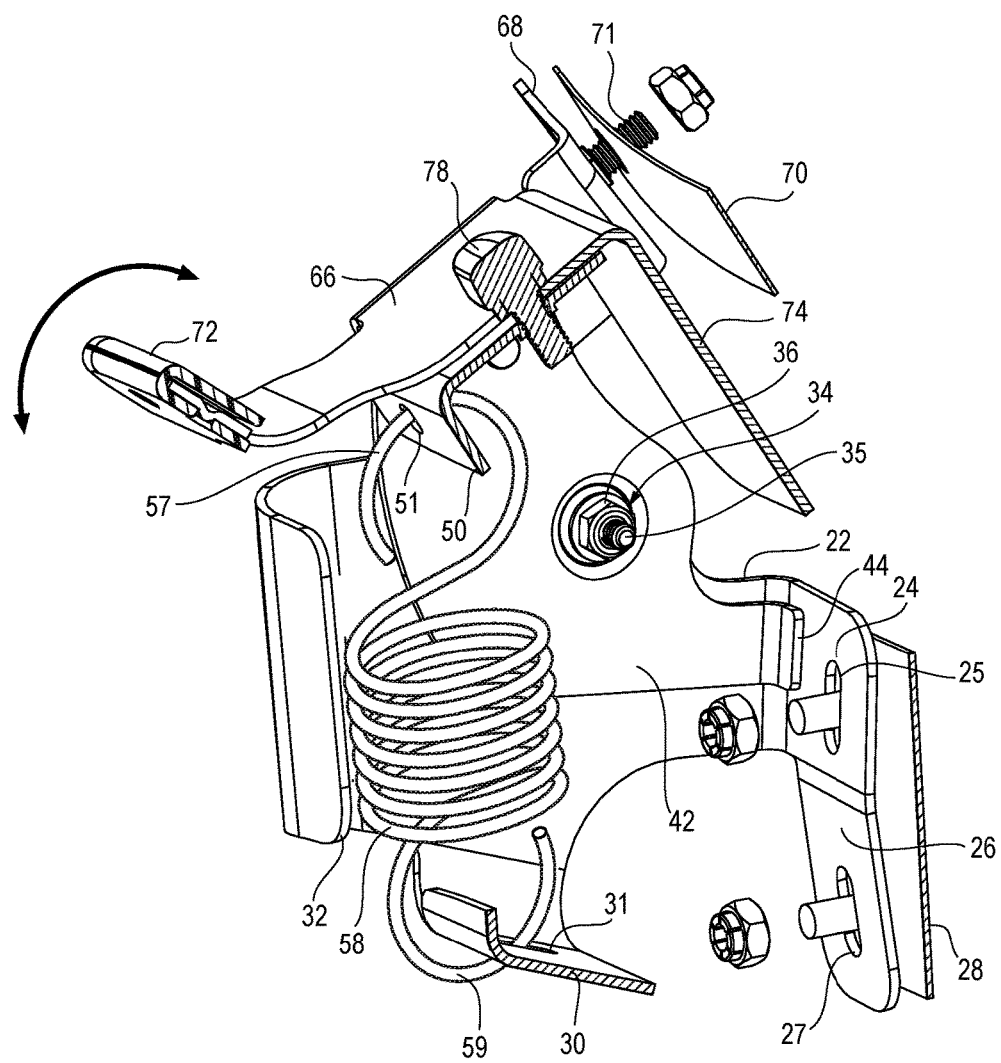
FIG. 3 is a cross-sectional perspective view of the hinge of FIG. 1 taken along line 3-3 and showing the hinge assembly in an open position, and showing a foot or stop on a middle bracket limiting the amount the hinge may be opened.
Figure 4:
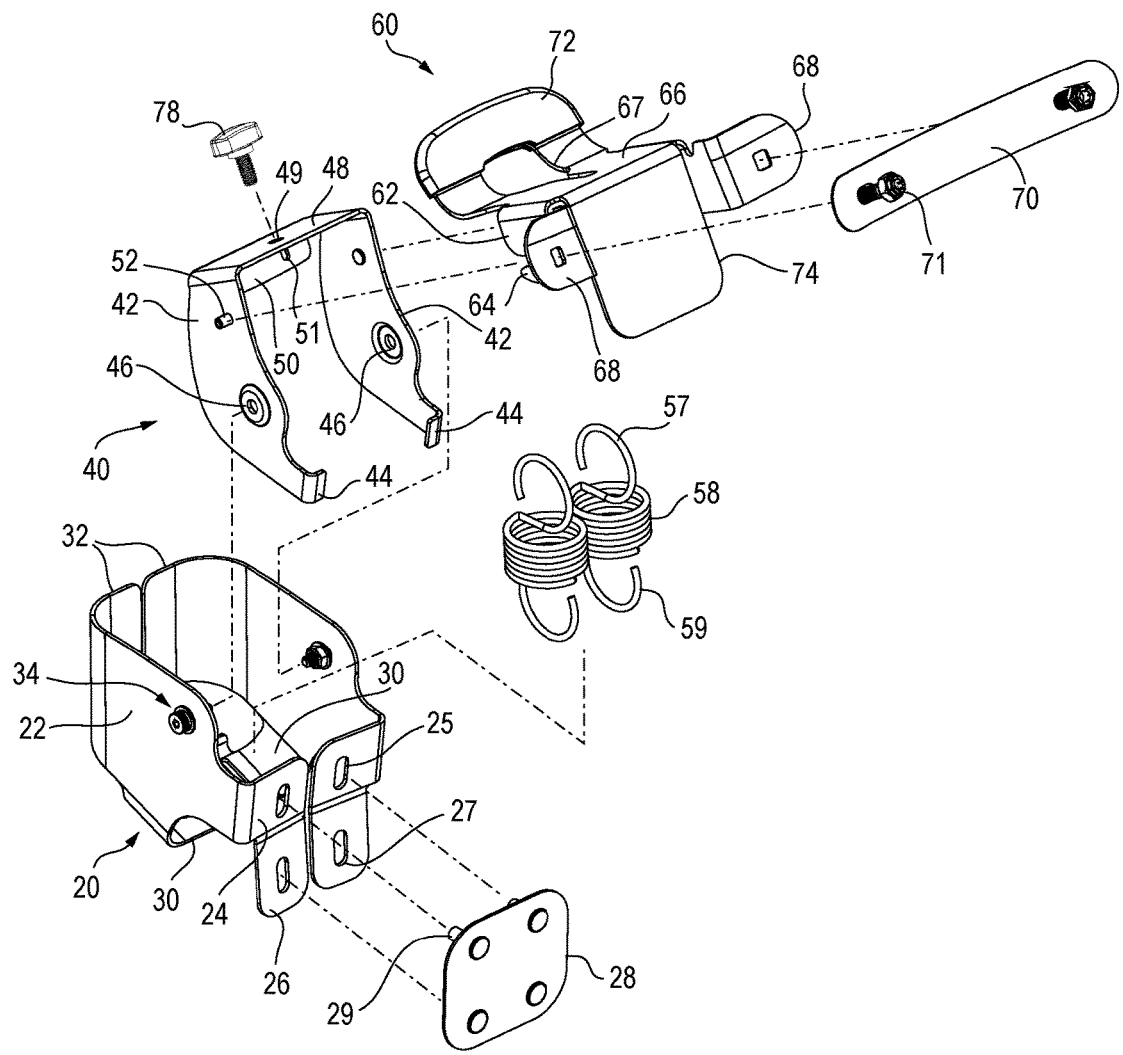
FIG. 4 is an exploded perspective view showing the principal components of a preferred embodiment of the hinge assembly of the present invention.
Figure 5:
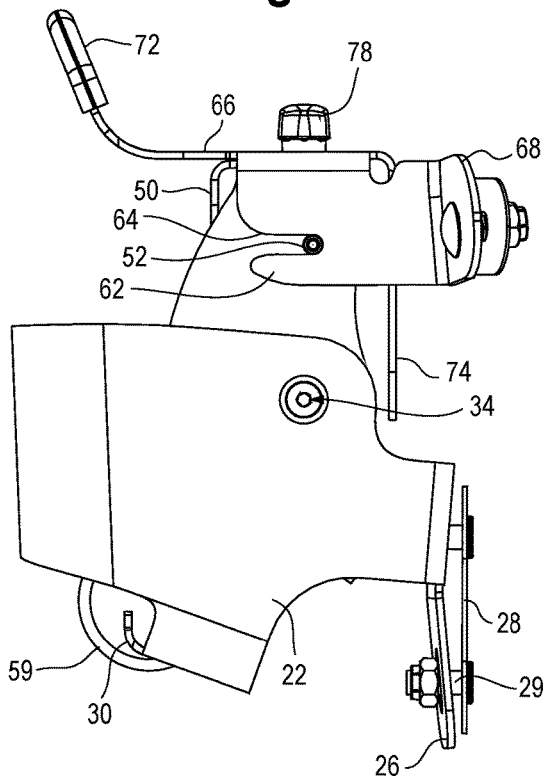
FIG. 5 is a side plan view of the preferred hinge of the present invention shown in a closed position.
Figure 6:
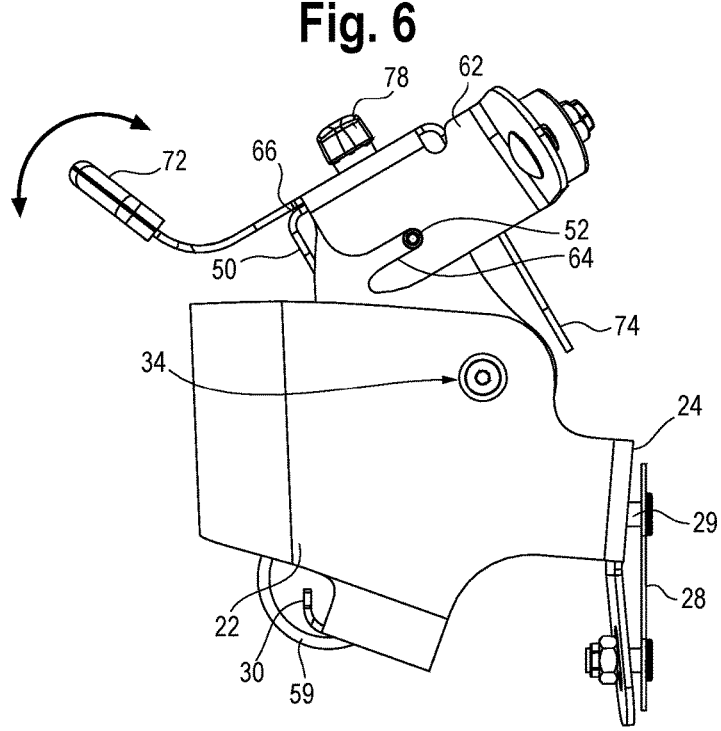
FIG. 6 is a side plan view of the preferred hinge of the present invention shown in an open position.
Figure 7:
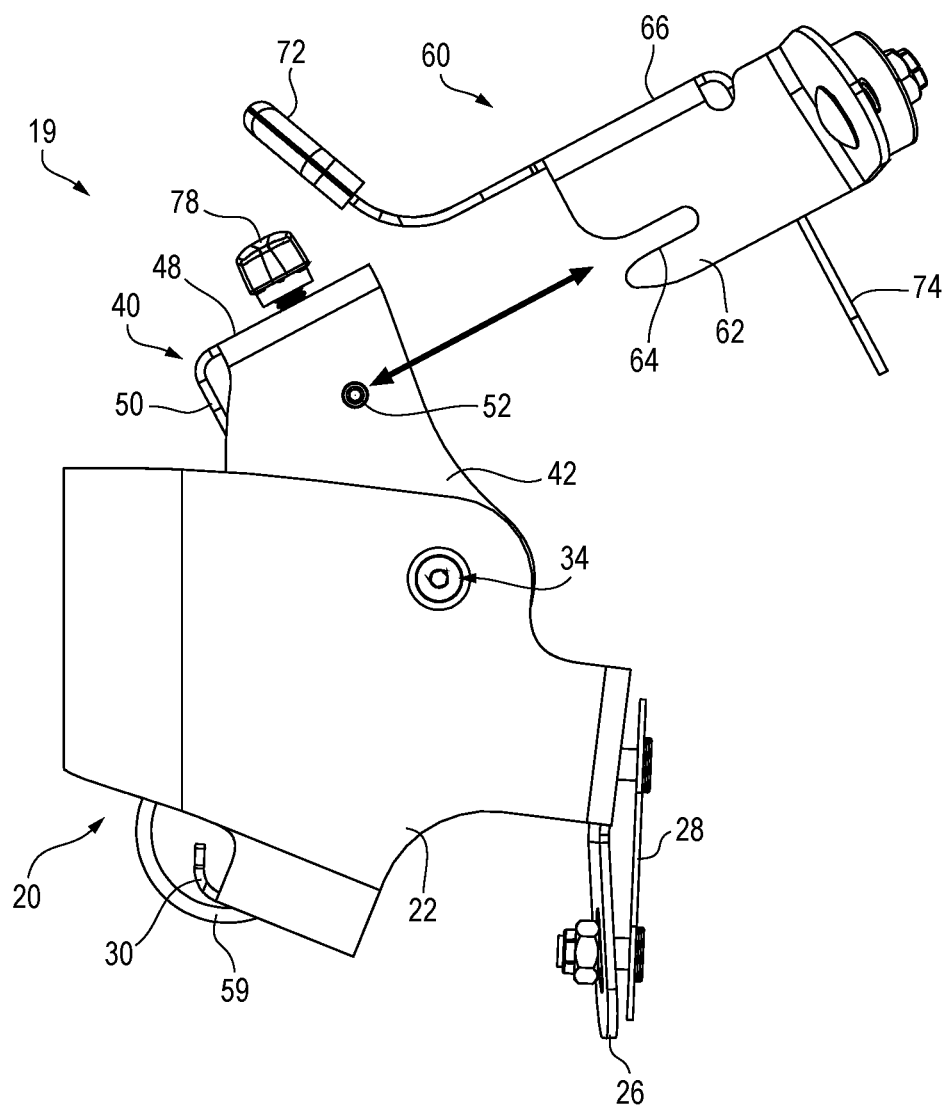
FIG. 7 is a side plan view of the hinge of FIG. 6 showing a preferred lid bracket removed from a preferred middle bracket.
Figure 8:
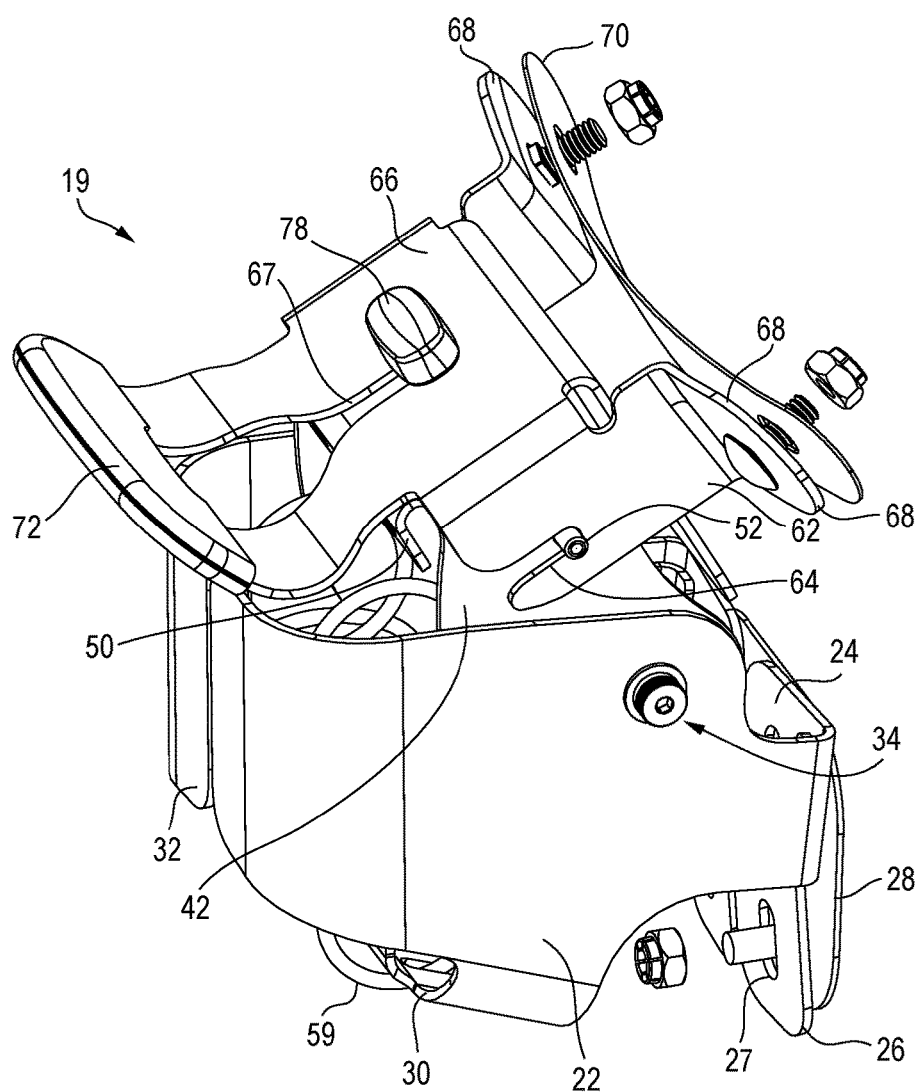
FIG. 8 is a perspective view of a preferred hinge assembly of the present invention shown in an open position and with the preferred lid bracket attached to the preferred middle bracket.
Figure 9:
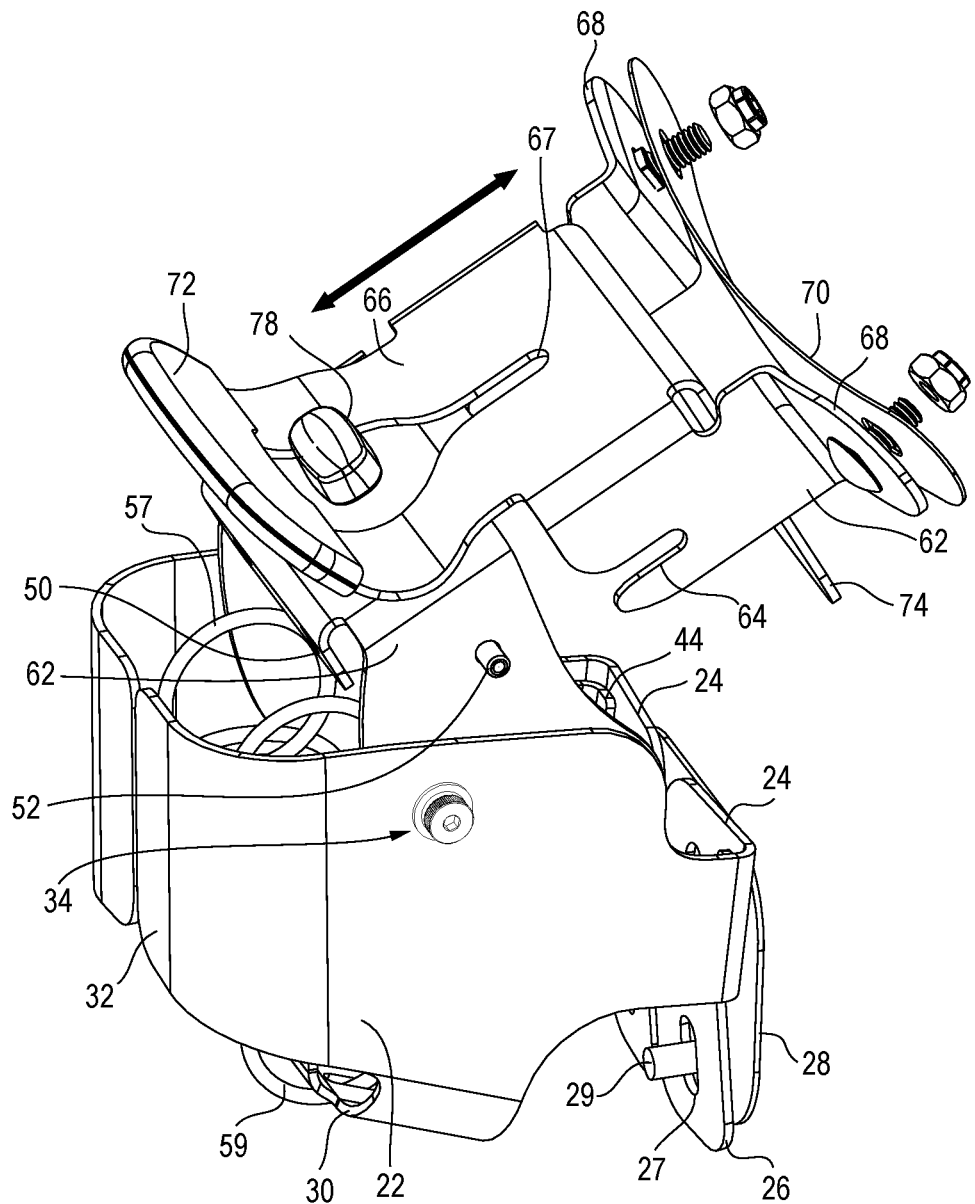
FIG. 9 is a perspective view of the hinge of FIG. 8 showing the preferred lid bracket in the initial stage of removal from or reinstallation on the preferred middle bracket.
Figure 10:
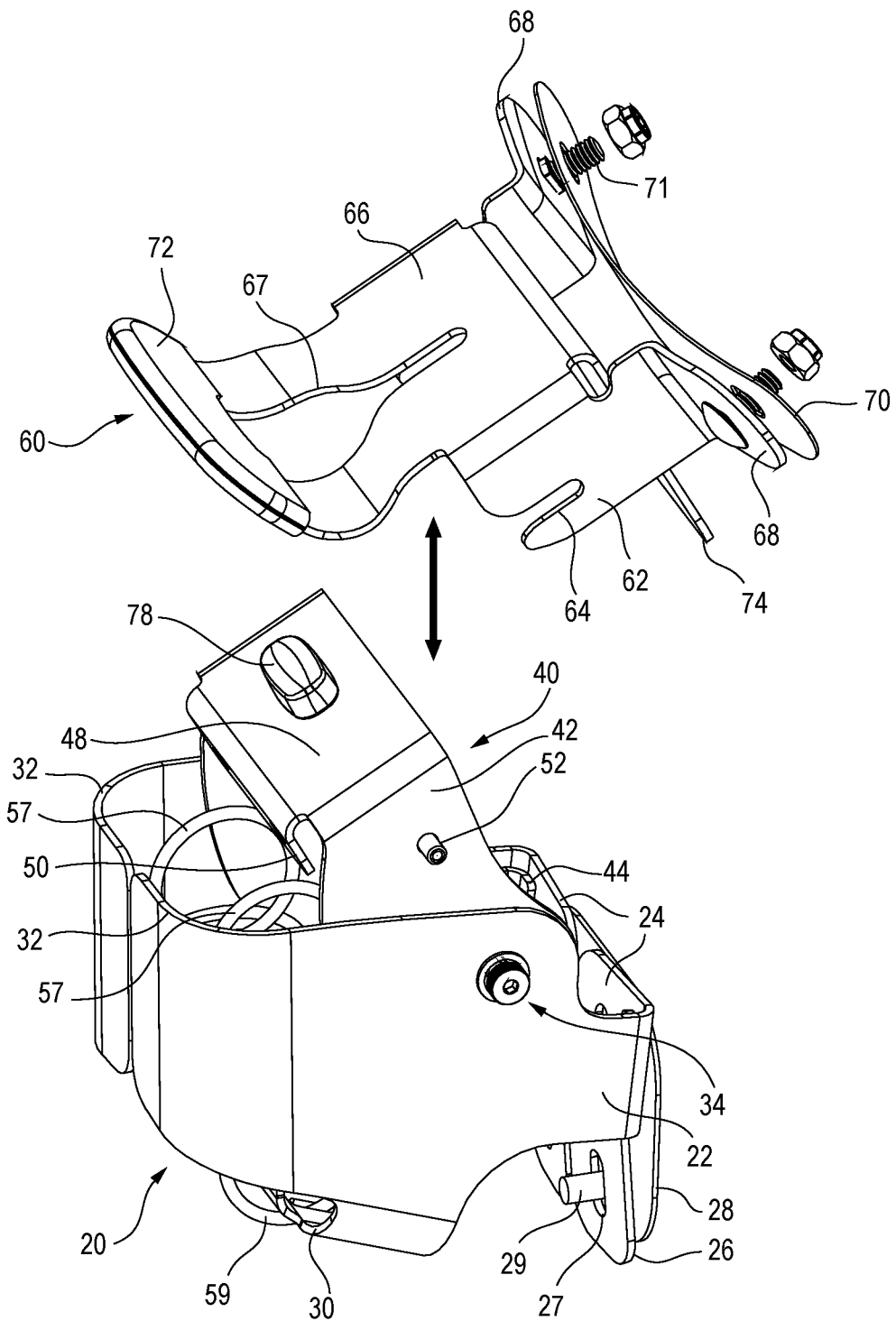
FIG. 10 is a perspective view of the hinge of FIG. 8 shown with the preferred lid bracket fully removed from the preferred middle bracket.

The operation of a preferred embodiment of hinge 19 may be seen by reference to FIGS. 5-7, 8-10 and 11-13. In particular, bowl bracket 20 is installed on bowl 15 as shown in FIGS. 11-13. Similarly, lid bracket 60 is installed on lid 17 as shown in FIGS. 11-13. In the closed position, i.e., when lid 17 covers bowl 15, the hinge assembly 19 is in the position shown in FIGS. 5 and 11. When desired, lid 17 is lifted to the open position as shown in FIGS. 6, 8 and 12. Since lid bracket 60 is secured to middle bracket 40, middle bracket 40 pivots in bowl bracket 20. In embodiments having feet 44, middle bracket 40 pivots until feet 44 contact the bowl attachment flanges 24 or other satisfactory portions of bowl bracket 20. This stops further pivoting of middle bracket 40, lid bracket 60 and lid 17 (see also FIG. 3). In this manner, lid 17 may be opened and closed as desired. If provided, spring 58 assists in opening the lid.

When originally purchased, bowl bracket 20 will be affixed to bowl 15 and middle bracket 40 will be pivotably mounted to bowl bracket 20. Lid bracket 60 will be affixed to lid 17. To hinge the lid 17 to bowl 15, the lid lock slot 67 of lid bracket 60 is aligned with lid lock fastener 78. In the preferred embodiment, the head of lid lock fastener 78 easily fits within the large keyhole shaped lid lock slot 67 (see FIG. 9). Simultaneously, guide slots 64 on guide flanges 62 are aligned with alignment pins 52 of middle bracket 40. When properly aligned, lid lock fastener 78 is in the narrow portion of lid lock slot 67 and the alignment pins 52 are completely within guide slots 64. Lid lock fastener 78 may then be tightened and the lid 17 is secured to the bowl 15. To remove the lid 17 from bowl 15, lid lock fastener 78 is loosened and the lid 17 and accompanying lid bracket 60 are removed from the middle bracket 40.

Figure 14:
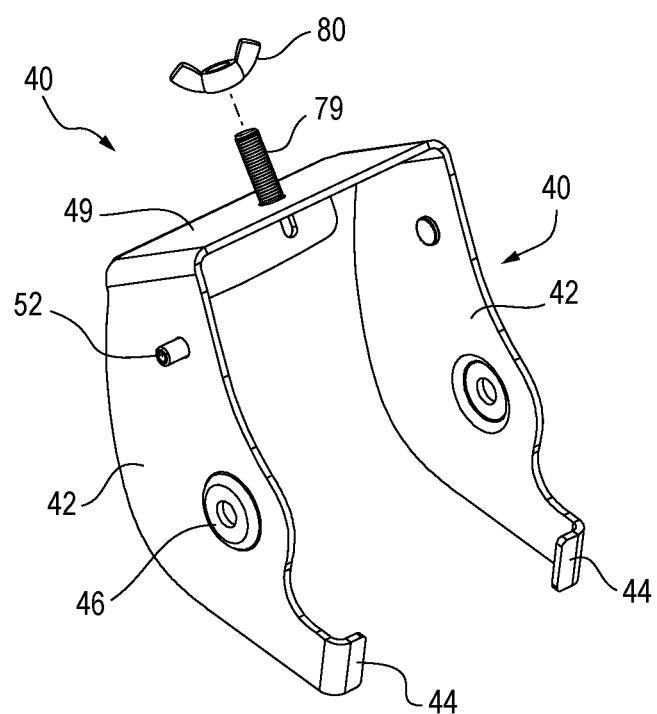
FIG. 14 is a perspective view of an alternative embodiment of a middle bracket of the present invention including an upstanding post and a cooperating nut as one means to removably secure the lid bracket to the middle bracket.

It will be understood by those of skill in the art that lid bracket 60 may be removably secured to middle bracket 40 with a variety of means, including that of the preferred embodiment discussed above. As another example, and as shown in FIG. 14, the upper flange 48 of middle bracket 40 may be provided with an upstanding threaded post 79 that may accept a nut 80. To remove the lid bracket 60 and lid 17 in this embodiment, the nut 80 is loosened and the lid bracket 60 removed or reinstalled as discussed above. It will also be understood by those of skill in the art that lid lock slot 67 does not have to be keyhole shaped, although that shape is preferred for ease of installation and uninstallation of lid bracket 60 from middle bracket 40. Numerous other alternatives are within the scope of these inventions as will be understood by those of skill in the art.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A hinge for a grill, the grill having a bowl that supports a fuel grate and a cooking grate and a lid for covering the bowl, the hinge comprising:
    a stationary bowl bracket secured to the bowl, the bowl bracket projecting outwardly from the bowl;
    a pivoting middle bracket pivotably mounted to the bowl bracket; and
    a removable lid bracket secured to the lid, the lid bracket removably securable to the middle bracket such that the lid and lid bracket may be selectively removed from the middle bracket.

2. The hinge of claim 1 wherein the middle bracket includes at least one stop to limit the amount the lid may open.

3. The hinge of claim 1 wherein the middle bracket includes an upper flange, the upper flange having an aperture that accepts a lid lock fastener and the lid bracket includes an upper attachment member, the upper attachment member having a lid lock slot that mates with and may be secured to the middle bracket with the lid lock fastener such that the lid may pivot about the hinge when the lid bracket is secured to the middle bracket and the lid and lid bracket may be removed from the middle bracket when desired.

4. The hinge of claim 3 wherein at least one spring is provided, the spring connected at one end to a spring flange on the bowl bracket and the other end connected to a spring flange on the middle bracket, the spring assisting in opening the lid.

5. The hinge of claim 3 wherein the middle bracket includes two side members and an alignment pin attached to each side member and wherein the lid bracket includes two opposing guide flanges, each guide flange having a guide slot, the guide slots mating with the alignment pins on the middle bracket.

6. The hinge of claim 5 wherein the middle bracket includes at least one stop to limit the amount the lid may be opened.

7. The hinge of claim 3 wherein the lid lock slot is a keyhole shape.

8. A hinge for pivotably mounting a lid of a grill to a bowl of the grill, the hinge comprising:
    a bowl bracket affixed to an outer edge of the bowl, the bowl bracket including two generally parallel opposing side walls, each side wall including a lower spring mount;
    a middle bracket having two generally parallel and opposing side members, an upper flange extending between the two side members and an upper spring mount on the upper flange, the side members of the middle bracket pivotably mounted to the side walls of the bowl bracket;
    a lid bracket affixed to an outer edge of the lid, the lid bracket having two generally parallel opposing guide flanges, an upper lid attachment member extending between each guide flange, the lid bracket removably secured to the middle bracket; and
    at least one spring having two ends, one end attached to the upper spring mount on the upper flange of the middle bracket and the other end attached to the lower spring mount.

9. The hinge of claim 8 wherein the upper flange of the middle bracket includes an aperture that accepts a lid lock fastener and the upper lid attachment member of the lid bracket includes a lid lock slot that cooperates with the lid lock fastener such that the lid bracket (and associated lid) may be selectively secured to and removed from the middle bracket using the fastener.

10. The hinge of claim 9 wherein an alignment pin is attached to each side member of the middle bracket and each guide flange of the lid bracket includes a guide slot that cooperates with the alignment pin such that the lid bracket is guided into engagement with the middle bracket.

11. The hinge of claim 10 wherein at least one side member of the middle bracket includes at least one stop that cooperates with the bowl bracket to limit the amount the lid bracket and lid may open.

12. The hinge of claim 11 wherein the lid lock slot is key shaped.

13. A hinge assembly for pivotably and removably mounting a lid of a grill to a bowl of a grill, the hinge assembly comprising:
    a bowl bracket affixed to the bowl of the grill, the bowl bracket having a bowl attachment flange to be affixed to an outer edge of the bowl and two generally parallel opposing side walls;
    a middle bracket having two generally parallel and opposing side members, an upper flange extending between the two side members and including a threaded aperture, two alignment pins, one affixed to each side member and at least one stop that is capable of engaging the attachment flange of the bowl bracket, the middle bracket pivotably mounted to the side walls of the bowl bracket;
    a lid bracket affixed to the lid of the grill, the lid bracket having two generally parallel, opposing guide flanges, each guide flange including a guide slot that cooperates with the alignment pin of the middle bracket, an upper lid attachment member between the guide members, and a lid lock slot on the upper lid attachment member; and
    a lid lock fastener that cooperates with the threaded aperture of the middle bracket, the lid lock fastener releasably securing the lid bracket to the middle bracket such that the lid may be pivoted from a closed position to an open position and the lid and lid lock bracket may be removed from the hinge assembly using the lid lock fastener.

14. The hinge assembly of claim 13 wherein the middle bracket is provided with at least one stop to limit the amount that the lid may be pivoted upward.

15. The hinge assembly of claim 14 wherein the lid lock slot has a keyhole shape.

16. The hinge assembly of claim 15 wherein a handle portion is provided on the upper lid attachment member of the lid bracket.

17. The hinge assembly of claim 15 wherein at least one spring is provided, the spring having two ends, one end attached to a lower portion of the bowl bracket and the other end attached to an upper portion of the middle bracket.

18. A hinge assembly for use on a grill, the grill having a bowl and a lid for covering the bowl, the hinge assembly comprising:
    a bowl bracket affixed to the bowl;
    a middle bracket including means for pivotably mounting the middle bracket to the bowl bracket;
    a lid bracket affixed to the lid; and
    means for removably attaching the lid bracket to the middle bracket.

19. The hinge assembly of claim 18 wherein the means for removably attaching the lid bracket to the middle bracket includes an upstanding post on the middle bracket, an aperture on the lid bracket and a removable nut cooperating with the upstanding post.

20. The hinge assembly of claim 18 wherein the means for pivotably mounting the middle bracket to the bowl bracket includes mating apertures on the bowl and lid brackets and a cooperating fastener.

\* \* \* \* \*